UNITED STATES PATENT OFFICE 2,283,622

MANUFACTURE OF IRON AND STEEL BY THE OPEN HEARTH PROCESS

James J. Bowden, Cleveland Heights, and John S. Suda, Parma, Ohio

No Drawing. Application August 2, 1940, Serial No. 350,138

12 Claims. (Cl. 75—54)

This invention relates to the manufacture of iron and steel by the open-hearth furnace process. As is well known to those skilled in this art, the oxide phase of the heat in the open-hearth process is, perhaps, the most critical and most difficult of control of any of the phases or steps which occur in the operation of said process.

One of the objects of our invention is to enable this oxide phase of the heat to be effectively controlled, with consequent improvement in the quality of the iron and steel produced by such process.

A further object of our invention is to reduce the time required for making the heat, with attendant economy in operation.

We accomplish the foregoing objects in and through the incorporation in the practice of the open-hearth process of alumina ($Al_2O_3$) in such proportion as to secure in the tapping or draw off slag, the presence of a sufficient amount of alumina to replace or inhibit an excess of iron oxide ($Fe_2O_3$) which otherwise would be present in such a slag in the form of calcium ferrites.

Our reason for wishing to control the formation and amount of the calcium ferrites is because the dicalcium ferrites constitute the instrumentality through which oxygen is transmitted from the slag to the steel bath; hence, it is obvious that if we can control the formation and the amount of dicalcium ferrites in the slag, it follows that we can also control the extent of oxidation of the steel bath itself. It is a well known fact to those skilled in the art to which our invention relates that a large percentage of open hearth heats (especially the low-carbon types) require only a small amount of thinning, and in some cases no thinning at all—whereas, in the control of the oxide phase as contemplated by us, the addition of $Al_2O_3$ in an appreciable amount is necessary in substantially all of the low carbon heats made.

It is a well known metallurgical and mineralogical fact that the calcium aluminates have a strong affinity for calcium ferrites and form crystal solutions; also that tetracalcium alumino ferrite ($4CaO, Al_2O_3, Fe_2O_3$) has the property of forming a complete series of crystal solutions with dicalcium ferrite, with a narrow melting range, and in this form the ferrites are not reactive in the transmission of oxygen from the slag to the steel bath. It follows, therefore, that, by the addition of alumina-bearing materials to the open hearth charge or process in critical amounts, we can inhibit or control the formation of the calcium ferrites, by converting them into calcium alumino ferrites. It follows also, that, because of the superior affinity of $Al_2O_3$ for CaO and $Fe_2O_3$, the formation of tetracalcium alumino ferrite also inhibits the formation of dicalcium ferrite in the proportion or measure that alumina and lime are present. This relationship between the lime ferrites and the lime alumino compounds is definitive, and our study of several hundred typical open hearth slags shows that, by the addition of critical amounts of alumina bearing materials, we can effectively control the amount of dicalcium ferrite in the slag, within the limits necessary to satisfactorily control the transfer of oxygen from the slag to the steel bath.

Ordinarily we accomplish both objects of our invention by adding the alumina to the charge, the proportion or percentage of alumina to be added to the charge in order to obtain the desired minimum proportion of $Fe_2O_3$ (in combination as dicalcium ferrite) in the final slag being readily susceptible of calculation, as will be pointed out hereinafter. Where the alumina is to be incorporated with the limestone charge, its proportion by weight to the limestone charge will be from 2% to 12½% of the weight of the limestone, the alumina being preferably employed as a constituent of an alumina-containing compound. A study of the analyses of several hundred different final slags shows that the proportion of 2% to 12½% by weight of the alumina to the weight of the limestone charge is critical in controlling the oxide phase of the heat and in minimizing the extent of oxidation of the molten metal.

The source of alumina which we prefer to use is a cement which contains alumina in compound composition; and the cements which we prefer to use are those which contain alumina in composition as tricalcium aluminate and tetracalcium alumino ferrite, for reasons which will be explained hereinafter. Cements which we prefer to use are those of high alumina content, although the ordinary Portland cement can be used successfully.

Our present preferred method of preparing the limestone charge is by first reducing the limestone to a rather finely divided condition, wherein the smallest particles will be somewhat larger than are capable of passing through a 32-mesh screen. These particles are then intimately mixed with the source of alumina employed, as by the use of a helical rotary conveyor-type mixer. Where a cement constitutes this source, it can be formed into a slurry, and the particles of limestone then coated therewith, either by spraying or by dipping.

Where the object in view is the effective control of the oxide phase of the final slag, the proportion of cement (or other alumina-bearing compounds) to the limestone employed will be such as to secure in the final slag a ratio of $Al_2O_3$ to $Fe_2O_3$ of from 3:2 to 2:7. In practice, we have found no marked benefit in respect to the control of the oxide phase of the final slag can be obtained by employing $Al_2O_3$ in a ratio less than 1:3 to the $Fe_2O_3$ in such slag. Adding $Al_2O_3$ in the proportions set forth converts corresponding proportions of the $Fe_2O_3$ in the final slag into tetracalcium alumino ferrite, which is inert as to oxidizing properties in comparison with $Fe_2O_3$, which otherwise would be present as dicalcium ferrite ($2CaOFe_2O_3$).

The limestone and the cement (or other alumina-bearing material) having been mingled in the manner described hereinbefore, we prefer to form the resulting mixture into briquettes which will be of the most suitable size for charging and to employ these briquettes in place of the ordinary limestone charge. Where cement is employed in a sufficiently high proportion with respect to the limestone, it will furnish the desired proportion of alumina to control the oxide phase of the final slag; also, when employed in such proportion and in even lower proportions, it facilitates the formation of the mixture into briquettes possessing ample crush-resisting strength, but which briquettes, being subjected thereafter to the high temperatures incidental to the practice of the open hearth process, will be shattered by the expanding and breaking of the cement ingredient thereof, thereby facilitating the fusion or solution of the limestone charge.

It is believed that the manner in which the cement operates to secure the more rapid fusion of the limestone and the control of the $Fe_2O_3$ phase of the final slag can be clarified by reference to the following representative chemical analysis and compound composition of a rapid setting Portland cement:

*Representative chemical analysis*

| | Parts by weight |
|---|---|
| CaO | 64.6 |
| SiO | 19.7 |
| $Al_2O_3$ | 6.2 |
| $Fe_2O_3$ | 2.5 |
| MgO | 2.6 |
| Loss on ignition | 1.9 |

*Compound composition (mineralogical abbreviations)*

| | Parts by weight |
|---|---|
| $C_3S$ | 56 |
| $C_2S$ | 15 |
| $C_3A$ | 12 |
| $C_4AF$ | 8 |
| MgO | 2.6 |
| Free CaO | 1.3 |
| Insol residue | .6 |

It will be noted from the foregoing analyses that, in addition to the lime-silica compounds the Portland cement contains 12 parts by weight of tricalcium aluminate and 8 parts by weight of tetracalcium alumino ferrite. The proportions by weight of tricalcium aluminate and tetracalcium alumino-ferrite will be correspondingly higher in cements of higher alumina content. It is well known that in the ordinary open-hearth process the lumps of lime floating around in the slag are coated with dicalcium silicate, which requires so high a temperature for its fusion or solution as to contribute greatly to the length of time required for the fusion or solution of the entire limestone charge. The melting or fusing point of dicalcium silicate is 2130° C. The dissociation point of tricalcium aluminate is 1535° C. and the fusing point of tetracalcium alumino ferrite is 1415° C., both of which are below the temperature at which the dicalcium silicate decomposes; and for this reason these alumina compounds very materially assist the fluxing or solution of the higher melting point dicalcium silicate and calcium oxide. In ordinary practice, due to the absence of alumina in critical amounts, the solution of the dicalcium silicate and calcium oxide would have to be obtained through the fluxing action of the much slower reacting calcium ferrites, which unfortunately presents the added danger of the accompanying over-oxidation of the heat. Furthermore, because of such alumina addition and by virtue of the law of eutectics, these two compounds of alumina, namely; tricalcium aluminate and tetracalcium alumino ferrite, definitely assist in lowering the fluxing temperature of the lime, slag or mixture to a point that we believe to be lower than that of either of the alumina bearing compounds. It is also true that any other alumina bearing compound will assist in the same manner by combining with the lime and lowering its fluxing point. In effect, therefore, to assist in putting the lime into solution more rapidly, it is necessary only to introduce alumina into the system, either as such or in some form in which the alumina is in combination, as in cement, or otherwise, as for example, in kaolin.

In addition to effecting the fusion or solution of the limestone ingredient of the final slag more rapidly than can ordinarily be accomplished, we are also able, by the use of the foregoing alumina compounds, to control the $Fe_2O_3$ phase of the said slag by the substitution of the alumina in the cement (or other alumina-bearing material) for the $Fe_2O_3$ in the calcium ferrites of this slag. This substitution is made possible by the fact that alumina possesses a greater affinity for lime than does $Fe_2O_3$; hence, the alumina will replace the $Fe_2O_3$. In this connection, it is noted that tetracalcium alumino ferrite and alumina form each a complete series of crystal solutions with dicalcium ferrite, with a narrow melting range.

According to recognized authority, the reaction between lime and alumina occurs at a temperature well below those encountered in the open hearth process, forming either $CaOAl_2O_3$, $2CaOAl_2O_3$, $3CaOAl_2O_3$ or $5CaO3Al_2O_3$ according to the proportions of lime and alumina employed.

The proportion of alumina to the limestone charge may be readily calculated on the basis that the limestone in a typical charge constitutes for example 10% of the total furnace charge. The CaO in this limestone constitutes 5.6% of the total furnace charge; but the CaO in a typical tapping or draw-off slag may constitute approximately 42% thereof. In other words, about 1% of CaO in the charge will yield 7.5% CaO in the slag. So we may assume the same approximate relationship for the $Al_2O_3$ in the charge to that in the final slag; or to obtain the presence of an additional 2.5% of $Al_2O_3$ in the final slag for the purpose of replacing or inhibiting a corresponding proportion of $Fe_2O_3$, it would be only necessary to add about $\frac{1}{3}$ of 1% of the total metallic charge as $Al_2O_3$. Based on the same assumption that the limestone in a typical charge is equal to 10% of the total metallic charge, the incorporation in the final slag of $Al_2O_3$ in an amount approximately equal to, and preferably slightly in excess of, $\frac{1}{10}$ of 1% of the total metallic charge, will insure the presence of all of the $Fe_2O_3$ in the final slag as tetracalcium alumino ferrite; and the corresponding percentage of $Al_2O_3$ in the final slag will be approximately equal to, and preferably slightly more than, 3%. With this concentration or percentage of $Al_2O_3$ in the final slag the $Fe_2O_3$ or oxide phase of said slag will be non-reactive. Dependent upon the amount of oxidation control to be accomplished, the alumina content may constitute from $\frac{1}{10}$% to 1.25% of the total charge weight, or from 2% to 12½% of the weight of the limestone. The study of the analyses of several hundred different final slags referred to hereinbefore, has convinced us that the proportions of from $\frac{1}{10}$% to 1.25% of alumina to the total charge weight or from 2% to 12½% of alumina to the weight of the limestone are critical in enabling us to realize the objects of our invention. This percentage of $Al_2O_3$ to limestone can be readily determined from an analysis of the cement or other alumina-bearing agent which we incorporate with the limestone charge.

We have found that, beginning with the addition to or presence in the final slag of 1.5% $Al_2O_3$, we can initiate a practical desirable control of the oxide phase, and that between this percentage and a percentage short of 3% we can effect a practical working range of control of said phase; also that, by the presence in or addition to of 3% or more $Al_2O_3$ in the final slag, all of the $Fe_2O_3$ therein will be present as or in the mineral tetracalcium alumino ferrite ($4CaOAl_2O_3Fe_2O_3$) wherein it is nonreactive to the iron or steel beneath the slag.

While we prefer cements of high alumina content as sources of alumina because of their ready availability and their particular alumina-containing ingredients, nevertheless, other sources of alumina may be used advantageously, such as a low-alumina cement, kaolin, corundum, feldspar, gibbsite, cryolite, blast-furnace slag and bauxite. Any of these may also be used to supplement the alumina in cement where cement is used as a source of alumina.

The introduction of moistened cement as the alumina-bearing material in the open hearth charge may carry with it certain percentages of silica which may have been formed by hydrolysis. We realize that any such silica may have to be taken care of by the use of the open hearth charge of sufficient limestone to compensate therefor. The amount of limestone necessary to be added can, of course, be calculated from the percentage of available $SiO_2$ in the moistened cement.

Where a limestone having alumina incorporated therewith in accordance with our invention is used in place of the ordinary limestone charge in an open hearth furnace, the time required for making a heat is not only materially reduced, owing to the more rapid fluxing or fusing of the limestone, but the quality of the tapping slag is also improved, and the liability of the iron or steel to be over-oxidized is reduced to a minimum.

While we prefer to incorporate the alumina with the limestone in the manner described hereinbefore, nevertheless advantageous results may be obtained by adding the source of alumina to the open-hearth charge in other manners, as by dusting the same upon the limestone charge, or by adding sacks containing the same to the open hearth charge, or in any other manner adding alumina-bearing material to the charge.

We also contemplate controlling the oxide phase of the open hearth process by the direct addition to the slag of the alumina, either as such or as contained in any of the sources thereof hereinbefore set forth.

This application is a continuation in part of our application Serial No. 283,864, filed July 11, 1939.

Having thus described our invention, what we claim is:

1. A fluxing agent suitable for use in the production of open-hearth iron and steel, the same consisting essentially of a bonded mixture of limestone with a compound containing or capable of yielding aluminum oxide, wherein the weight of the aluminum oxide constituent of said compound is approximately 2% to 12½% of the weight of the limestone.

2. A fluxing agent suitable for use in the production of open-hearth iron and steel, the same consisting essentially of a bonded mixture of particles of limestone with a compound containing or capable of yielding aluminum oxide wherein the weight of the aluminum oxide constituent of said compound is approximately 2% to 12½% of the weight of the limestone.

3. A fluxing agent suitable for use in the production of iron and steel, the same consisting essentially of a mixture of particles of limestone with a cement containing alumina in composition in substantially the following proportions by weight: from 1 to 6 parts of cement to 30 parts of limestone.

4. A fluxing agent suitable for use in the production of open-hearth iron and steel, the same consisting of lumps or briquettes each consisting essentially of a mixture of particles of limestone mingled with and bonded together by alumina-bearing cement in substantially the following proportions by weight: from 1 to 6 parts of cement to 30 parts of limestone.

5. A fluxing agent suitable for use in the production of open-hearth iron and steel, the same consisting of lumps or briquettes each consisting essentially of a mixture of particles of limestone mingled with and bonded together by a cementitious compound containing or capble of yielding aluminum oxide, the limestone and cementitious compound being mingled in the following proportions by weight: from 1 to 6 parts of cementitious compound to 30 parts of limestone.

6. A fluxing agent suitable for use in the production of basic open hearth iron and steel, the same consisting essentially of a bonded mixture of particles of limestone with a cement containing alumina in composition, in substantially the following proportions by weight: from 1 to 6 parts of cement to 30 parts of limestone.

7. In the process of manufacturing basic open-hearth furnace iron and steel the step of controlling the oxide phase of the final slag which consists in incorporating $Al_2O_3$ therewith in such proportion that the ratio of $Al_2O_3$ to $Fe_2O_3$ in the said final slag will be from 3:2 to 1:3.

8. In the process of manufacturing basic open-hearth furnace iron and steel, the step of controlling the oxide phase of the final slag which consists in adding to said slag $Al_2O_3$ in a proportion sufficient to insure the presence of from 1.5% to 7% $Al_2O_3$ in said slag.

9. In the process of manufacturing basic open-hearth iron and steel, the step of controlling the oxide phase of the final slag which consists in adding to the charge sufficient $Al_2O_3$ to insure the presence of from 1.5 to 7% $Al_2O_3$ in said slag.

10. In the process of manufacturing basic open-hearth iron or steel, the step of controlling the oxide phase of the final slag which consists in adding $Al_2O_3$ thereto until the percentage of $Al_2O_3$ in said final slag is not less than one third the percentage of $Fe_2O_3$ in the said slag.

11. In the process of manufacturing basic open-hearth furnace iron and steel, the step of controlling the oxide phase of the final slag which consists in adding $Al_2O_3$ thereto in an amount whereby the ratio of the same to the $Fe_2O_3$ in the slag will be not less than 1:3, thereby to convert the reactive calcium ferrites in the slag into non-reactive calcium alumino ferrites.

12. In the process of manufacturing basic open-hearth iron and steel, the step of controlling the oxide phase of the final slag which consists in adding thereto an alumina bearing material in a quantity sufficient to insure that at least 50% of the total ferric oxide ($Fe_2O_3$) in said slag shall be present in or as the mineral tetracalcium alumino ferrite ($4CaOAl_2O_3Fe_2O_3$) wherein said ferric oxide is non-reactive to the steel or iron beneath said slag.

JAMES J. BOWDEN.
JOHN S. SUDA.